United States Patent
Abanami et al.

(10) Patent No.: US 7,908,219 B2
(45) Date of Patent: Mar. 15, 2011

(54) INBOX MANAGEMENT

(75) Inventors: Thamer A. Abanami, Seattle, WA (US); Craig Lichtenstein, Redmond, WA (US); Jeremy Robinson, Seattle, WA (US); Megan Lesley Tedesco, Sammamish, WA (US); Mark D. Zuber, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 11/556,639

(22) Filed: Nov. 3, 2006

(65) Prior Publication Data

US 2008/0109543 A1    May 8, 2008

(51) Int. Cl.
*G06F 21/00* (2006.01)

(52) U.S. Cl. .................... 705/59; 705/904; 715/716

(58) Field of Classification Search .................... 705/59, 705/904; 715/716
See application file for complete search history.

(56) References Cited

U.S. PATENT DOCUMENTS

| | | | |
|---|---|---|---|
| 5,629,980 A * | 5/1997 | Stefik et al. ............. | 705/54 |
| 5,654,747 A | 8/1997 | Ottesen et al. | |
| 6,240,401 B1 | 5/2001 | Oren et al. | |
| 2002/0049679 A1 | 4/2002 | Russell et al. | |
| 2003/0028395 A1 * | 2/2003 | Rodgers et al. ............. | 705/1 |
| 2003/0028652 A1 | 2/2003 | Bardini et al. | |
| 2003/0069854 A1 | 4/2003 | Hsu et al. | |
| 2004/0024688 A1 | 2/2004 | Bi et al. | |
| 2004/0148424 A1 | 7/2004 | Berkson et al. | |
| 2004/0181490 A1 | 9/2004 | Gordon et al. | |

OTHER PUBLICATIONS

Clement, M. "Digital Rights Management—Lessons from Content-for-Free Distribution Channels," http://www.michelclement.com/Download/DRM.pdf#search=%22managing%20media%20file%20expiration%2Bpdf%22.
Neumann et al., "Large Scale Content Distribution Protocols," ACM SIGCOMM Computer Communication Review, Oct. 2005, http://www.acm.org/sigs/sigcomm/ccr/archive/2005/october/p85-neumann.pdf#search=%22media%20file%20expiry%20metadata%2Bpdf%22.
Curtis et al., "Metadata—The Key to Content Management Services," IEEE, 1999, http://www.ee.ucl.ac.uk/~fstentif/curtis.htm.

* cited by examiner

*Primary Examiner* — Andrew J. Fischer
*Assistant Examiner* — Jamie Kucab
(74) *Attorney, Agent, or Firm* — Marshall, Gerstein & Borun LLP

(57) ABSTRACT

Media devices that transfer content to other devices may manage a user's received media files by creating a media device inbox. Shared content may be stored in an inbox cache that is separate from the device's main content library to exclude limited-access inbox content from interaction with the device's main library. Further, inbox content may be altered upon expiration to reduce resource consumption and inbox clutter.

13 Claims, 10 Drawing Sheets

INBOX MANAGEMENT

BACKGROUND

Media devices are in common use among a broad base of users. Radio and television have provided entertainment for generations of users. Portable transistor radios of the 1960s began a trend to smaller and more robust personal media devices including very small devices storing all digital content on both rotating and non-rotating media. Streaming media is available over both wireless and wired networks and may be displayed on cellular telephones and other portable media devices.

Media devices may send and receive content over a variety of data networks including cell-based and isochronous networks. For example, the IEEE 802 standard family describes various local and wide-area networks (LAN and WAN, respectively) that carry variable-sized packets and may be used to transfer media content between media devices. Media devices communicating over an 802-type network, or any other type of network, are able to share information and transfer data files. Much of the data communicated between portable media devices consists of copyright protected works. For example, digital media devices may communicate virtually perfect digital copies of protected music, video, and photo files between devices unless a type of digital rights management (DRM) technique is employed. DRM techniques involve limiting the use of copyright protected works to allow content owners to determine and control who and how users can view, use, and share digital media objects. For example, DRM rules limit digital content use by destroying or degrading the object when a DRM rule is violated.

Further, portable media devices or other computing devices may share or transfer DRM-protected content. Once a protected object is transferred, DRM techniques may become difficult for the content owners to manage effectively. As devices transfer and receive many objects through the network, managing protected objects that, due to the DRM rules, become inactive, expired, or disabled may result unwanted resource consumption at the receiving device. In addition, a receiving device may become cluttered and unmanageable if a high number of received, but unusable objects are stored on the device as part of the device's media library. Unless a system manages shared or transferred objects effectively, the user experience may become significantly degraded.

SUMMARY

Media devices that are capable of transferring content to other devices may include a media device inbox to manage a user's received media files while providing effective DRM. A media object that contains both content and metadata may be communicated to a media device and stored in an inbox cache that is separate from the device's main content library. Inbox cache items may be accessed through the inbox interface to exclude expired or otherwise inaccessible objects from interaction with the device's main content library while enforcing DRM rules for both shared content and content received from other sources. Further, inbox media objects may be altered upon expiration to reduce resource consumption and inbox clutter. Inbox items may also be sorted in useful significance to the user, for example, by the inbox object's expiration time, a trusted sender list, or metadata such as media type.

DETAILED DESCRIPTION

Figure 1:
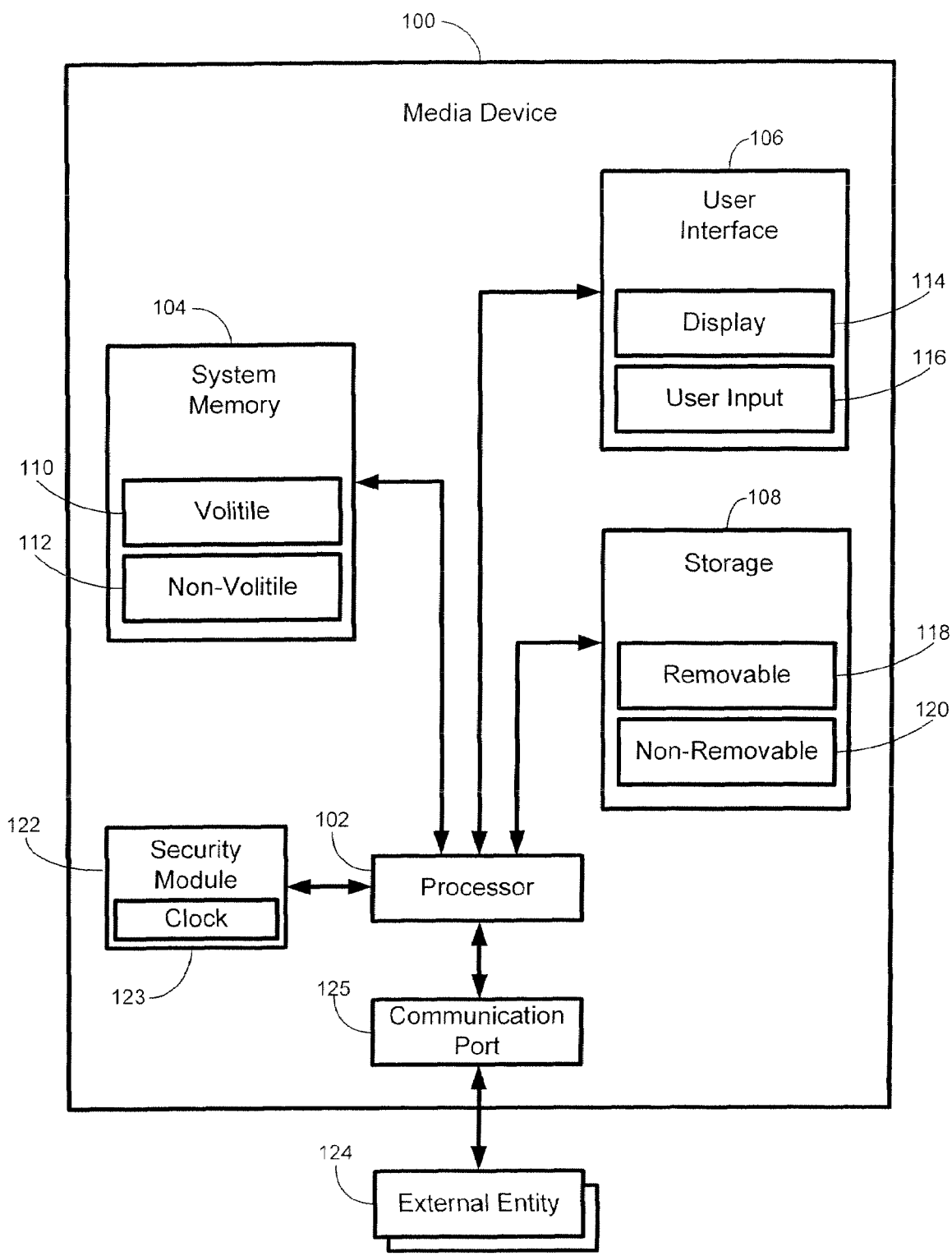
FIG. 1 is an illustration of hardware for a portable media device.

FIG. 1 is an illustration of exemplary hardware that may be used for a media device 100 that may provide effective DRM for media objects transferred between devices by managing the device inbox. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. While any mode of input device would work with the concepts of the present invention, user input(s) 116 may include either manual buttons, soft buttons, or a combination of both. Soft buttons may be used when the display 114 includes a touch screen capability. Manual buttons may include re-definable keys with programmable legends.

A security module 122 may be coupled to the processor. The security module 122 may be used to store cryptographic keys used in digital rights management (DRM). The security module 122 may also have specialized hardware or processors for performing cryptographic calculations, such as stream decryption, without burdening the processor 102.

Lastly, the security module 122 may include secure memory for storing record data associated with limited use rights for received media objects. The security module 122 may also include a tamper resistant clock for determining expiration periods on licenses. Management of limited use rights for media objects is discussed in more detail below.

The media device 100 may also contain communications connection(s) 125 that allow the device 100 to communicate with external entities 124, such as network endpoints, other media devices, network access points, or a computer used for synchronization. Communications connection(s) 125 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery or an input from a power converter.

In operation, a user may connect to external entities 124 through a variety of network types to include local and wide area networks using any number of communication protocols and standards. For example, a media device may connect to a network implementing any of the Ethernet, ARCNet, FDDI, IEEE 1394, Token Ring, or TCP/IP standards. Media devices may connect to each other through a central access point or in an ad hoc fashion. Once connected, the devices may share and transfer data files including media content. A user may receive a media object, including, for example, music or video content, over the communication port 125. In one embodiment, the media object may be sent over an ad-hoc wireless network from an external device 124. To illustrate, the media object may have been purchased for use on the external device 124 and the user of the external device 124 may be entitled to full and unlimited access to that media object using that device. The user of the external device may wish to share the media object with a user of the media device 100 and may forward the media object to the media device 100.

Figure 2:
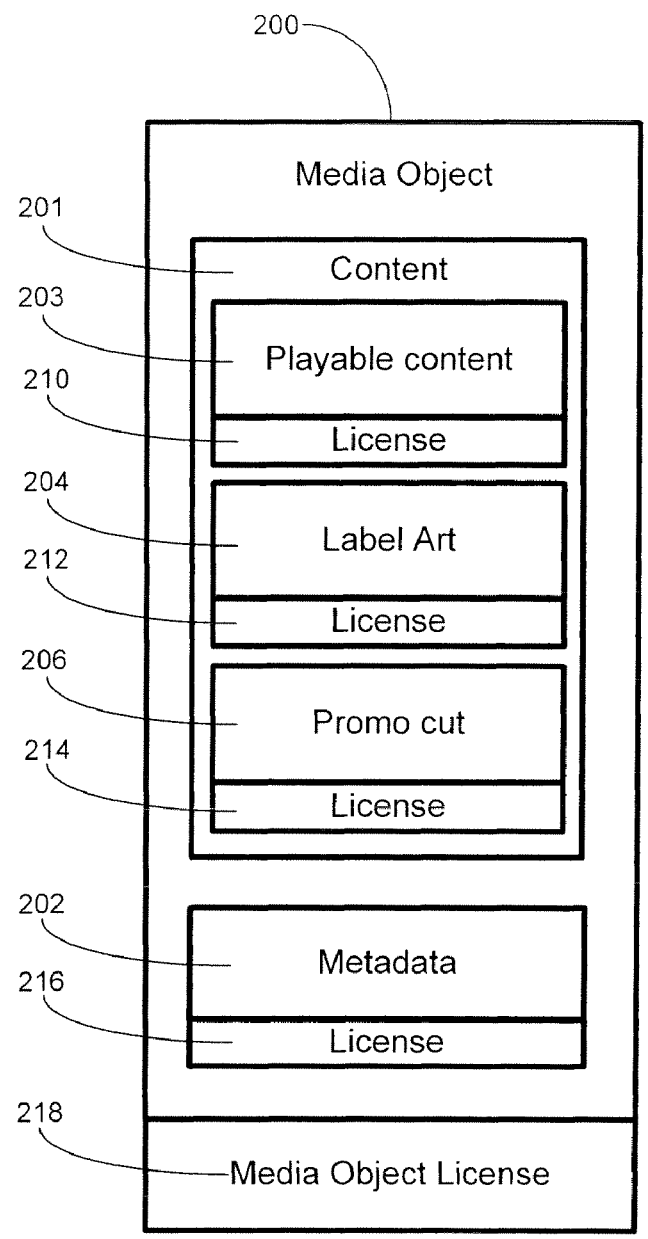
FIG. 2 is a flow chart of a method of evaluating and applying a limited use license to received media content.

Referring to FIG. 2, a simplified and exemplary block diagram of the structure of a media object is shown. The media object 200 may include various individual elements including content 201 and metadata 202. The metadata 202 may consist of any information related to the data and may include, without limitation, the object name, a object size, a transfer time, an origin descriptor, an object creation time, an object type, or the number of prior transfers. In one embodiment, the metadata may include information about the sender, for example, a virtual card having information the user may wish to share about himself or herself. More than one type of virtual card may be shared, for example, one card may have likes and dislikes, a top-ten list, favorites, or even an email address, but no personally identifiable information. Another virtual card may have address, phone number, a private email address, or other contact information. Cards may be shared separately or in combination. If the metadata is associated with a media object, the metadata may also include media information. Without limitation, metadata associated with an audio object may include a song name, an artist name, an album name, a music genre, and a release date. Also, without limitation, metadata associated with a video object may include a title, a television video type, a movie video type, video credits, a family rating, a release date, a duration release date, and a duration. Still further, without limitation, metadata associated with a photo object may include a folder name and a thumbnail version of the photo. Further metadata items for both audio and video object may include a media type, artist descriptors, object running time, playlist membership, a rating, and artwork data.

The content may include a number of elements as well including, without limitation, playable content 203, label art 204, and a promo cut 206. Playable content 203 may be any form of data that may be interpreted by the media device 100 into an audio or video signal. For example, playable content may be a song, a movie, a photo, a text, or any other type of content that may be fixed to a tangible medium and that may, as with a song or movie, include a temporal element. Label art 204 may be any image associated with the playable content 203. Label art 204 may include an album cover, an advertisement, or a movie poster. Label art 204 may also include more than a single still image, such as a series of images or even video content. A promo cut 206 may be a shorter version of the playable content 203. For example, the promo cut 206 may include an edited version of the playable content 203, or may simply contain one or more references to temporal points within the playable content 203 so that, when accessed, only a portion of the playable content 203 may be heard or viewed. The media object 200 may also contain personalized information such as an audio or video message that may be sent with the media object 200. The device 100 may store and render personalized data separately from the media objects 200 as herein described.

Further, individual DRM rules or limited use licenses may be attached to each of the media object's component elements 200. The DRM rule may be any rule or set of rules that limits the use of protected works to allow content owners to determine and control who and how users can view, use, and share digital media objects. For example, a DRM rule may limit the number of times an object may be played within a specific time period. As shown, playable content 203 has license 202, while metadata 202 has license 216, label art 204 has license 212, and the promo cut 206 has license 214. By associating an individual license with each element, different rules may be applied, for example, allowing the promo cut 206 to be played at any time, whereas the playable content 203 may be restricted to a limited use license. Instead, or additionally, the entire media object 200 may be subject to a media object license 218 which may apply to all the elements incorporated by the media object 200. Each element may not be present in every media object 200. For example, a media object may only have playable content 203. In one embodiment, when an element or media object license is not present, rules in the media device 100 may be activated to apply a default license to the received media object 200, or any predetermined element.

When an object 200 is received at another media device 100, the device may determine the presence of content 201, metadata 202, and their associated sub-elements. Each element found may then be examined for license information related to an ability to use the media object 200. For example, a specific media object 200 may include elements of playable content 203, metadata 202, and cover art 204. Only the metadata 202 and cover art 204 may be available for unlimited use. The metadata 202 may include links to a web site for purchase as well as other works by the same artist and related information. By not limiting access to the metadata 202, the user may retrieve information to purchase the content after the license 210 has expired. Further examination may disclose that the content 201 is only available for limited, preview use. For example, the promo cut 206 may be available for rendering and may or may not be subject to further limited license terms. Also, if the media object 200 is received containing no explicit license terms, a default set of limited rights may be applied to any or all elements of the media object 200.

Terms of a limited use license may include the number of times the content may be played or a period of time over which the content may be played or any other rule or restriction on playback. In one embodiment, limited use terms may include unlimited plays for a 24-hour period. In another embodiment, limited use terms may include five plays over an indefinite period of time. When the media object 200 is part of a subscription package, unlimited use may be allowed during the subscription period. Alternatively, a combination of number of plays over a time period may be used. For example, content 201 may be allowed to be played a maximum of three times over a period of three days. To track this, a record of the date and time the media object 200 was received may be recorded and memory allocated for counting the number of times played. Optionally, media object metadata may also be transferred to the record. Each time the media object 200 is accessed, even for display, the record may be accessed to determine if the time allocation has been exceeded or if the number of plays has been exceeded. If either condition indicates the media object 200 should be expired, a range of steps may be taken to prevent the user from accessing at least the content portion 201 of the media object. For example, upon expiration, the device 100 may delete the media object 200 completely, may alter the appearance of the media object 200 metadata 202 in the user interface 106, or may not display the metadata on the user interface 106 at all, but instead, store the metadata 202 for later access while deleting the content portion 201. At a later time, the user may access the metadata 202 to re-acquire a license to play the content 201. In one embodiment, the record may be retained and queried to allow the user of the media device 100 to list information about media he or she has received as well as obtain purchase information about specific media objects.

Figure 3:
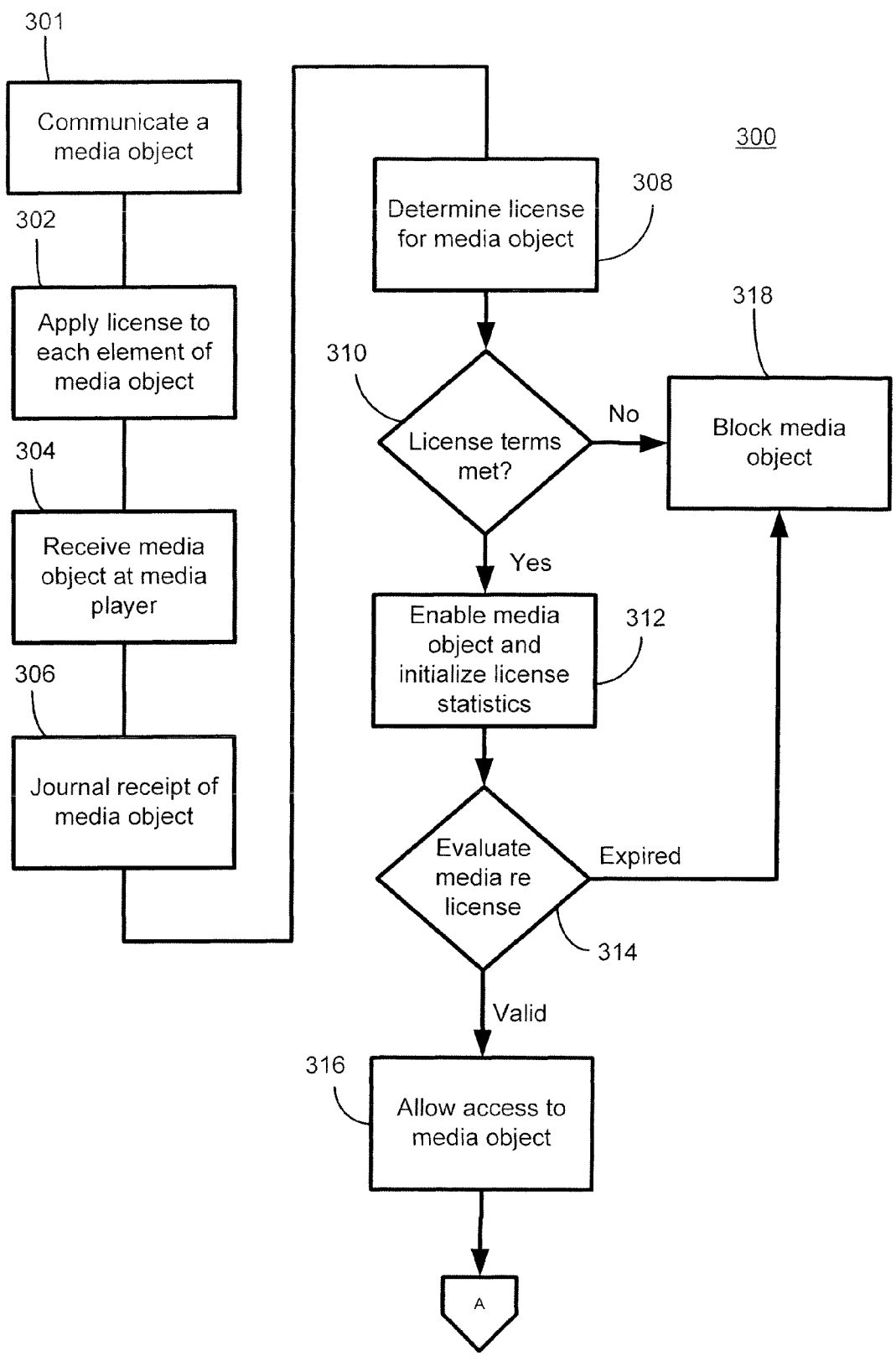
FIG. 3 is a block diagram of an exemplary media object.

The methods illustrated in the figures and described below may be implemented on a variety of wired and wireless networks and connections. While the following procedures are described from the standpoint of an external entity 124 connected to a media device 100, the method may also describe any compatible device connecting to either the external entity 124 or the media device 100. In FIG. 3, a flowchart illustrating a method 300 of applying a limited use licensed to received media is discussed and described. The media object 200 may be developed incorporating one or more elements that may include playable content, metadata corresponding to the playable content, a promotional version of the playable content, or label art. The playable content may be music, recorded literature, video, text, animations, games, executable programs, or the like.

At block 301, the media object 200 may be communicated from a first device 100 to an external entity 124 using a variety of file formats and communication methods. For example, the object 200 may be transferred via a wireless network link such as that described by the IEEE 802.11 standard. The object 200 may also be transferred over a wired network implementing any suitable communication method in a compressed or uncompressed digital format and may consist of both content and metadata.

At block 302, a license may be applied to each element of the media content, where the license specifies rights associated with each corresponding element of the media object. Alternatively, one license may be applied to the entire media object. Applying a license to the entire media object 300 or to individual elements may follow a generally known process of digitally encrypting and signing a licensed portion and distributing a key for decrypting to authorized users. In another embodiment, digitally signed media may be used to identify rightful owners without encrypting the actual content. Any device that may participate in the communicating transaction may apply the license to the media object 200.

At block 304, the media object 200 may be received at a media device, such as media device 100 of FIG. 1. The media object 200 may be downloaded from a synchronization source, such as a computer (not depicted), from a media service, or from another media device, for example over an infrastructure or ad hoc wireless network.

At block 306, a record of the receipt of the media object 200 may be created as a durable record of the receipt. The record may be kept as a "journal" of the objects 200 received by the device 100 over the course of its lifetime. The journal entry is more fully explained in relation to FIG. 4 below. Additionally, a record of the media object 200 may be created for use in tracking the status of a limited use license. In one embodiment, the two records may be the same. At block 308, the media object 200 may be examined for one or more licenses corresponding to the ability to playback the media content. Different embodiments may handle unlicensed content in different manners. In one embodiment, unlicensed media may be authorized for unlimited use. In another embodiment, unlicensed media may be given a default limited use license. When license terms apply to one or more elements of the media object, at block 310 an evaluation may be made to determine if the license terms have been met.

If the license terms have been met, the 'yes' branch from block 310 may be taken to block 312, where each of the authorized elements may be made available for playback or use. Additionally, the statistics for tracking use against a limited use license may be initialized, in one embodiment, either a number of plays to be allowed or an expiration date/time based on the receipt date/time and the term of the limited use license. Such statistics may be maintained in the security module 122 to reduce susceptibility to tampering. Each time the media is rendered, that is, requested, queried, displayed, or played, the license terms may be re-evaluated at block 314. The stored number of plays may be checked against a maximum number allowed, the current date/time may be compared against the previously calculated expiration date/time, or both may be checked. Other criteria may also be used, for example, an unlimited use license may be revoked only if evidence of tampering is apparent. Another license may be tied to a subscription, where unlimited plays are allowed during a subscription period. The license for one element may be independent of licenses for other elements of the same media object, that is, a license for a promotional cut 206 may be valid as long as copyright notices are present, where a license for the playable content 302 may only be valid during the limited license period. Licenses may be tied to classes of media objects. In one embodiment, a subscription license may apply to all media objects with metadata that defines the media object 200 as belonging to the subscription, for example, by record label.

When the license is valid for the requested element, the 'valid' branch from block 314 may be followed to block 316 and access to the requested element, or the entire media object 200, may be granted. Access may range from simply listing of the media object 200 or its component elements in a user interface 106 to playing the content 203. Other uses of the media object elements may include using the metadata to find artist or purchase information, or to use the label art 204 as a screen wallpaper. Upon access, a number of graphical user interfaces may be presented and managed according to FIG. 6 and the accompanying description.

When the license terms are not met at block 310 or the license is no longer valid at block 314, the respective 'no' and 'expired' branches may be followed to block 318 where the media object, or individual elements, may be blocked. Blocking may include removing the media object 200, or elements, from a listing of available objects or deleting the media object 200 from the media device 100. When the media object 200 is hidden, so that requests to list available media objects do not include the removed item, it may be retained so that a future purchase or subscription may allow re-presentation of the media object 200 without an additional download process, potentially saving time and inconvenience.

Figure 4:
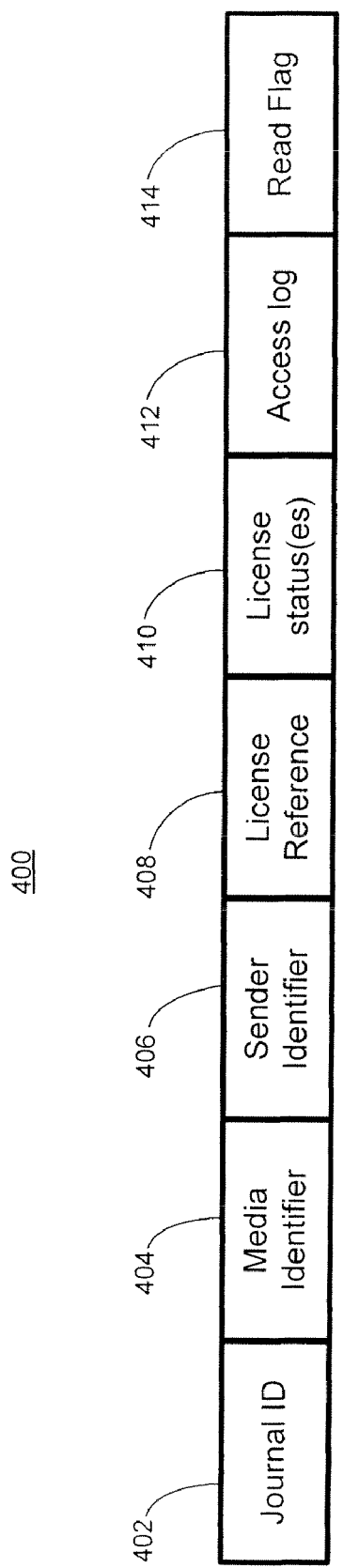
FIG. 4 is a simplified and representative view of a journal entry for a media object.

FIG. 4 is an exemplary layout of a journal entry 400 used to track media activity on the media device 100 as introduced in block 306 of FIG. 3. The journal entry 400 may be created upon receipt of the media object 200, as shown at block 300 above. If the media object 200 is added during a synchronization process and not individually received from another device, the media device 100 may not become aware of the media object 200 until the media object 200 is accessed, for example, displayed on the user interface 106. Further, media objects 200 received from other media devices 100 may be added to another computing device during the synchronization process. Creation of the journal entry 400 may involve creating a record in a database, creating a line of data in a flat file, or creating a separate file associated with the media object 200 to which it refers. In some embodiments, more than one form of a journal entry 400 may be maintained. The journal entry 400 may include a journal identifier 402, a media identifier 404, a sender identifier 406, a license reference 408, a license status field 410, an access log 412, and a read flag 414. The journal identifier 402 may be an identifier to uniquely distinguish the journal entry 400 from other journal entries. In one embodiment, the journal identifier may be a sequential number. In another embodiment, the journal identifier 400 may be a based on a date/time code, supplemented, if needed, by a sequence number.

The media identifier 404 may be a unique identifier that corresponds to the media object 200 itself. For example, the media identifier 404 may be a bar-code like number assigned by the publisher that incorporates portions for identifying the publisher, copyright holder, the work itself and any track identifiers. Alternatively, the media identifier 404 may simply be the text of the name of the album/CD and the song, or movie. The media identifier 404 is ideally assigned by an industry association or by the publisher in accordance with an industry standard. When media has limited rights, such as a three play limit, the media identifier can be used to search other journal entries to see if the limited rights for that work are already expired, as explained below.

The sender identifier 406 may be used to identify the party that shared the media object 200. The sender identifier 406 may be a device global unique identifier (GUID), a name selected by a user of a sending device, such as device 126, or a combination of the two. The sender identifier 406 may allow a recipient to identify where a certain media object 200 came from and to give the recipient another method of organizing media on the media device 100, that is, by sender. In the case where media content 200 is played directly from the sending media device and no actual media content is downloaded and stored, i.e. a disk jockey session, these first three parts of the media identifier may be all that is entered in a journal entry 400.

The license reference 408 may be an explicit definition of the terms of a license, for example, unlimited, limited, restricted, none. The variables associated with license terms may relate to one or all of use of playable content 203, preview content, metadata use, or access to cover art. Table 1 illustrates a representative relationship between license types and elements of media content. Forwarding relates to a user's ability to send media content to another device and is discussed more with respect to FIG. 5.

TABLE 1

| Media object/License | Unlimited | Limited | Restricted | None |
| --- | --- | --- | --- | --- |
| Playable content | Open | limited term | not allowed | Not allowed |
| Promotional cut | Open | Open | not allowed | Not allowed |
| Metadata | Open | Open | Open | open |
| Cover art | open | limited term | not allowed | not allowed |
| Forwarding | All | promo cut & metadata only | metadata only | not allowed |

License status 410 may be used to log status when a limited term license is to be enforced. The license status 410 data may include the date/time when the media object 100 was received for use in calculating an expiration period for the limited term license, when required. The license status 410 may also maintain a count of the number of times the playable content 203 has been used. In some limited term uses, one or both of an expiration date/time or number of plays may be considered when enforcing the limited use rights. License status 410 may be used for tracking not only the media object license 218 but also for individual element licenses 210, 212, 214, and 216. Lastly, the license status 410 may include an overall valid/invalid flag.

A trigger event may cause the status of the media object license 218 or any individual element licenses 210, 212, 214, 216 to be reevaluated. For example, a request to render the media object 200, that is, to list it in on the display 114 or play the playable content 203, or receiving the object 200 at another device's inbox may cause the license status 210 to be consulted to determine if the license is valid or invalid. If valid, the license terms may be extracted from the license reference 408 of the journal entry 400. The license status 410 may be consulted to determine if any limited license terms have been partially met, for example, two plays of three allowed plays. In this example, if the request is to play the playable content 203, the request may be granted and the count increased by one in the license status 410. The count now being equal to three will cause the license status to change from valid to invalid. An appropriate change to the license status 410 may then be made. Other events, such as power up may cause the license validity to be reevaluated.

Other embodiments may support license changes from invalid to valid, for example, acquisition of a general subscription license that covers the media object may override the media object license 218 and effect a change from invalid to valid. As above, this may be reflected in an update in the license status portion 410 of the journal entry 400. In the same fashion, license validity status for the media object 200 as a whole may be periodically reevaluated.

The journal entry 400 and more specifically the license status 410 may also be used to determine if a newly received media object 200 has already been received on the media device 100 and if the licenses for that media object 200 have been partially or fully used. For example, one way to defeat a 3 day/3 play limited license would be to have each media object 200 re-sent to the media device 100 every third day and thereby renew the license indefinitely. The persistent journal entry 400 may be used to determine if the media object 200 has been on the media device 100 before and the license status 410 may be used to determine what, if any, access is still allowed for that media object 300. If the media object 200 has been on the device for one day and played once, in a 3 day/3 play limited license, access may still be allowed. If on the other hand, the media object was previously played three times or the three day limit has expired, the media object 200 may be immediately expired and either deleted or saved but not displayed.

The journal entry 400 may also include a read flag 414 that indicates whether or not a synchronization device has read the media object 200. For example, device A may send a media object 200 to device B. Device B may perform a synchronization process with another computing device. Upon synchronization, the computing device may review journal entries 400 on device B to determine if there are any new objects 200 that the computing device has not yet processed. Unprocessed objects at device B may not be associated with journal entries 400 having set read flags 414, and the computing device may store the unread media object's metadata 202 or any other data associated with the media object 200. Further, if the media object 200 is a photo or similarly unlicensed object, the computing device may store the object itself. For example, a previously-unread photo sent to device B may be stored to the desktop of a computing device. After processing, the read flag 414 of the journal entry 400 associated with the unread media object may be set. Once set, the read flag 414 indicates that an associated media object 200 has been read. During subsequent synchronization processes, the computing device may not reprocess the media object 200 associated with the previously-read journal entry 400, but may, however, process all media objects 200 having journal entries 400 with unset read flags 414. The "read" flag 414 may also control object deletion upon license expiration. For example, an inbox object 200 may be deleted after 3 plays or a 3 day limit when the inbox object's journal entry 400 read flag 414 is set. Thus, the journal entry 400 read flag 414 associated with a media object 200 may indicate to a synchronizing computing device whether or not the media object 200 has been previously stored or processed at the computing device.

The access log 412 may contain a media object 200 history. The access log 412 may include the date/time when the item was received and may also include the date/time of each use of the media object 200, for example, the time(s) when the playable object 203 was played. The access log may be persistent and accessible after the media object 200 itself is expired, and may allow a user to recall playback of an object by the date and time of the event. The access log 412 may also include data corresponding to changes in license status and the triggering event that caused the license status to change. For example, a license may expire when the time limit, e.g. 3 days, runs out. This event may be recorded in the access log 412. Access of or license changes to the media object 200 or any of its component elements 203, 204, 206, 202 by the device 100 upon which the object resides, any other device 100, or external entity 124 may also be recorded in the access log 412.

Figure 5:
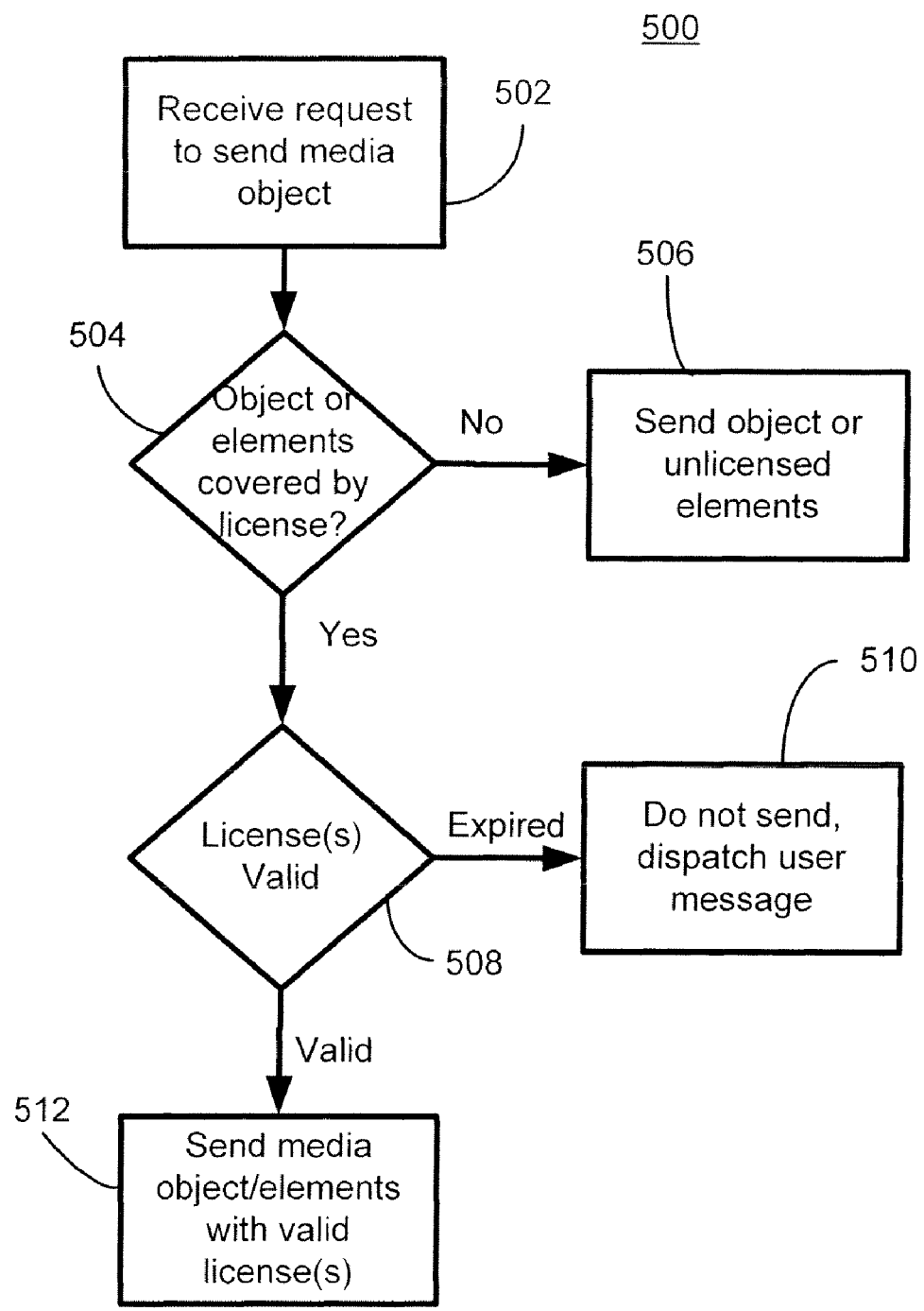
FIG. 5 is a flow chart illustrating application of a license to forwarding a media object.

With reference to FIG. 5, a method for forwarding media objects 200 to other devices 100 is discussed and described. At block 502, a request may be received via the user interface 106 to send a media object, such as media object 200, to another device, such a media device acting as an external entity 124. At block 504, the media object 200 may be examined to determine if the media object 200 as a whole or the individual elements are covered by a license. If the media object 200 is not covered by a license, for example, a photograph taken by the user and loaded by a synchronization process, or a user-recorded audio or video message, the 'no' branch from block 504 may be taken to block 506 and the media object 200 may be sent to the other device 126. In some embodiments, individual elements, such as elements 202, 203, 204, and 206 may be sent when no license corresponds to the given element. In other embodiments, only the media object 200 as a whole may be sent, when allowed.

If the media object 200 is covered by one or more licenses, the 'yes' branch from block 504 may be followed to block 508. The license validity may be checked to determine if the license is valid or expired, expired including any condition that renders the media object not usable. If the license is expired, the 'expired' branch may be followed to block 510 and the request to send is denied and not acted upon. A error message may be sent to the user indicating the action was not completed and, optionally, a specific license condition referred to. In one embodiment, the notification may include an offer to the user for purchasing a license or otherwise remedying the expiration condition.

If the license is found valid at block 508, execution may continue by following the 'valid' branch from block 508 to block 512. At block 512, the media object 200 may be sent to the requested party. In one embodiment, only those elements that have valid licenses may be forwarded. For example, as referred to in Table 1 above, the metadata 202 and promotional cut 208 may be sent when an exemplary limited license is valid, but only metadata may be sent when a restricted license is valid.

As shown, some license types can restrict the user's ability to forward content. This may be especially true when the content was forwarded from another device and, as such, does not have full rights. In one embodiment, the act of forwarding content with full rights to another media device may strip the media object license 218 from the media object 200. When received, the media device 100 may assign default rights to the content. Because the media device 100 may not have the cryptographic keys required to grant an unlimited license, a lower level license, such as 'limited' or 'restricted' may be automatically assigned. In one embodiment, a limited or restricted license may exclude access to the playable content 203 of the media object while allowing access to one or all of the other media object components. In a further embodiment, a limited or restricted license may strip media object components from the media object to which the user does not have access, thereby resulting in storing only those components on the device 200 that the user may access under the license terms. If the media device 100 has or obtains full rights to the media object 200, the media object license 218 may be upgraded. In some applications, however security requirements may dictate downloading a new copy of the media object 200 with a 'full rights' media object license 218.

Figure 6:
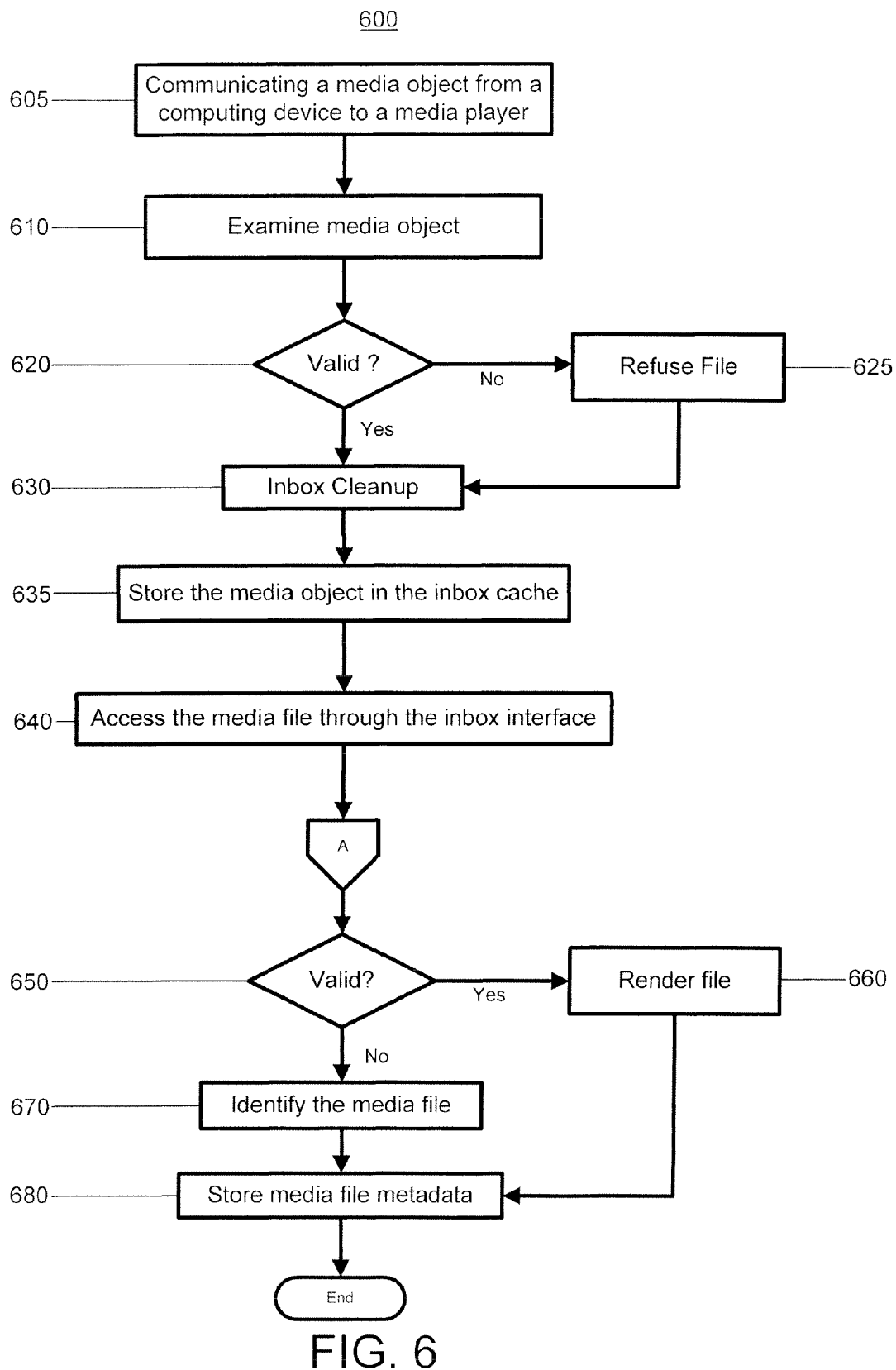
FIG. 6 is a flow chart illustrating managing a media object inbox.

With reference to FIG. 6, media objects 200 received at a device 100 that may or may not include DRM rules and limited use licenses may also be organized and managed by a method 600 on the device 100 to reduce unwanted resource consumption or user confusion while operating within DRM rules. At block 605, an external entity 124 may communicate a media object 200 to the media device 100. When the media object 200 is received at media device 100, the media object 200 may be stored in a temporary memory, such as memory 110. The external entity 124 may be any compatible computing device that is able to transfer data or media objects to the media device 100. One type of transaction involving media object communication may occur when a first media device user shares an object 200 from a first media device with a second user having a second media device in accordance with FIGS. 3 and 5 and the accompanying description.

At block 610, the media object 200 may be examined upon receipt to determine the media object's 100 composition. The method 600 may determine the presence of content 201, metadata 202, and their associated sub-elements. As previously described, each element found may then be examined for license information related to an ability to use the media object 200. For example, the promo cut 206 may be available for rendering and may or may not be subject to further limited license terms. Further, a promo cut 206 may not be available during a synchronization process to copy from the receiving device 100 to the external device 124. Also, if, upon examination, the media object 200 is received containing no explicit license terms, a default set of limited rights may be applied to any or all elements of the media object 200. For example, photo objects 200 received at the device 100 may be freely saved and freely transferable in their entirety. In another embodiment, photo objects may have optional licenses. For example, a user sending a photo object 200 may optionally choose to assign a restriction to the photo object before sending it to another user. The receiving user may then be limited to viewing the photo a number of times or prevented from further transferring the photo to other devices.

Further, the received object may be checked to see if the same content 201 has already been received and any corresponding rights previously exhausted. For example, the receiving device 100 may examine the objects that are presently stored in the inbox, or the device 100 may access a local or remote journal file 400 that contains historical information related to media objects 200 that have been received by the device 100. The journal file 400 may be compared to the metadata 202 of the incoming media object 200. In one embodiment, objects 200 may only be received by a device 100 a limited number of times. For example, to prevent periodically re-receiving a previously-received object and thereby circumvent a DRM rule or license term, the licensed object 200 may only be received once. Also, if multiple, identical objects 200 are received at the device, the device may determine which of the objects becomes an "active" object 200 to be stored in the inbox cache 104, 108. For example, the device 100 may determine that the first media object 200 to be rendered out of the multiple identical media objects is to be stored in the cache 104, 108, while the remaining identical media objects 200 may be discarded. Also, the received object's metadata 202 may be compared to the journal file 400 to determine the object's validity. For example, if the media identifier 404 of a present inbox object matches the incoming object identifier, then the object 200 may be refused.

Still further, the user may optionally include personal validation conditions for shared media objects received at or sent by the device 100. For example, the user may select an option that only accepts inbox items from specific senders on a trusted list, or from sources to which the user has a current or previous subscription. Also, the user may optionally choose to manually accept or decline each item or object 200 received at the inbox, regardless of the source or a class of sources.

If, at block 620, the incoming object is not valid, at block 625 the object 200 may be refused by the device 100. In one embodiment, refusing the object 200 may result in sending a notification message to either or both of the intended recipient and the object sender. For example, the message sent after refusal may include an offer to purchase the media object 200, renew a subscription, or otherwise gain a full or limited license to access and render the object 200. In a further embodiment, all or a portion of the object 200 may be removed from temporary memory 110. For example, all or a portion of the object 200 content 201 may be removed, while the metadata 202 may be optionally entered into a journal file 400. If, at block 620, the inbox object 200 is valid, the method 600 may proceed to block 630.

At block 630, the method may perform an inbox cleanup operation. In one embodiment, an inbox cleanup may compare the incoming media object 200 with metadata, license, and journal information, and eliminate files from the inbox that have expired or otherwise become inaccessible. In another embodiment, unlicensed objects 200 may never expire. For example, a photo object 200 may remain accessible for an indefinite period. An inbox cleanup routine 630 may skip or otherwise not process an unlicensed object. In a further embodiment, a user may optionally delete licensed or unlicensed objects 200 by marking or indicating to the inbox cleanup routine 630 to remove the objects. In a further embodiment, a user, the user may immediately remove the objects or delay removal of the objects with the inbox cleanup routine 630 or until a next synchronization process. Further, the temporary memory used at block 605 may be freed for subsequent use. Also, the method 600 may periodically perform the inbox cleanup 630 as part of a manual or automatic device 100 management operation. In one embodiment, the device 100 may perform an inbox cleanup 630 after a synchronization process with an external entity 124. In a further embodiment, a user may initiate an inbox cleanup 630 operation. The method 600 may also create or modify data related to the journal file 400 that may be accessed to determine previous object 200 expirations, refusals, or failed access attempts. The journal file 400 may also be used to 'unlock' or gain access to previously-expired objects that may have been removed from the inbox during the inbox cleanup 630. For example, a user may access a journal file 400 and view an entry associated with an expired or inaccessible object 200 that may or may not have been removed from an inbox listing. The user may select the expired object and choose to reactivate it for further rendering. Further, expired or removed media objects 200 may become "unlocked" by subscribing to a service that includes the object 200. Also, the inbox cleanup may remove all media objects 200 from the main library that have expired, notify the user of the expiration, or create or modify a journal file 400 to allow a user to renew the subscription or otherwise re-validate a license to restore access to one or more objects 200.

At block 635, the receiving media device 100 may store the transferred, licensed object in an inbox cache 104, 108. The inbox cache 104, 108 may reside in either the system memory 104 or storage 108. The media device 100 may include a variety of data storage areas 104, 108 that contain different data file types. For example, the storage areas 104, 108 may include both objects received at the inbox and objects stored permanently as part of a media device library. In one embodiment, memory 104, 108 allocated for the inbox cache is physically distinct from memory 104, 108 allocated for the media device library. In another embodiment, the memory 104, 108 allocated for the inbox cache is only logically distinct from the media device library memory 104, 108. In a further embodiment, the inbox cache may be a dedicated area of the memory 104, and in a still further embodiment, the inbox cache is a dedicated area of the storage 108. If the media object 200 is an unlicensed photo, a folder name associated with the photo object may include any organizational indicator for either the sending or the receiving device. For example, the sending device may associate the photo object with folder "A." The receiving device may optionally or automatically store the photo object to a folder "A" on the receiving device. In another embodiment, the receiving device user may optionally assign a new folder name to the photo object upon receipt. Still further, the photo object 200 may be automatically stored in a generic "received photos" folder at the receiving device.

At block 640, the user may access an inbox object. With reference to FIG. 7, the media device may have a number of graphical menus as part of the user interface 106 that may be presented to the user on the display 114 when the user provides user input 116 to access an inbox object. The graphical menus may be a graphical user interface implemented by any combination of software and hardware running on the media device 100 as part of the user interface 106. Each menu may be used to access different objects stored on the media device 100 and may be limited to accessing specific objects and performing limited actions with the objects. A main user interface 705 of the device 100 may reflect a newly-received inbox item 710 as one or more inbox indicators. One or more inbox status indicators 710 may present additional information to the user about the inbox objects, such as, a number of active objects 712 currently in the inbox. A status indicator 710 may also present other information about the inbox including a new object indicator(s), a number of expired objects, a new object or message from a friend or trusted sender indicator(s) 754, or a new object type. In one embodiment, the method 600 may access a media object 200 after performing an inbox cleanup as described in relation to block 630 above. For example, a user may be permitted to access an object 200 within a period of time after performing an inbox cleanup. If the period of time elapses, the device 100 may perform another inbox cleanup 630 before the user may be permitted to access another object 200.

The main interface 705 may include a number of menu categories including an option to access the main media library 715. A user may select items 720 from the main interface 705 by activating the media device controls 725. By selecting the media library option 715, the user interface may display a number of actions or other information 730 that the user may access. In one embodiment, the media library interface 715 may be restricted from accessing objects that are currently included in the inbox cache 104, 108 or listed in the inbox interface 735. For example, by restricting the media library interface 715 from accessing objects stored in the inbox cache 104, 108, expired or otherwise inaccessible objects, as well as promo-cut-only 206 enabled objects, and objects acquiring default, limited licenses upon reception at the inbox 735 may not be included in main library functions. Further, unlicensed objects that may never expire (i.e., photos or other unrestricted media objects) may be optionally sent to the media library upon receipt. In another embodiment inbox objects may be kept from becoming part of a "shuffle" playback function when a user likely would not desire to hear promo cuts 206 or be forced to skip over expired and inaccessible objects. Also, the user may be restricted to sending or sharing media objects that originate from the user's media library 104, 108, as previously discussed, to prevent unauthorized object access by continuously or periodically sending the object to renew limited access and rendering rights that may be associated with shared objects. In still another embodiment, the media library interface 715 includes an inbox sub-section 736 that may allow a user to access and render inbox media objects with or without including objects from the media library. For example, as discussed below, inbox objects to which the user has a current subscription may optionally be transferred to the media library. Further, if the clock 123 is completely reset or lost due to, for example, a complete battery drain or replacement, the inbox objects may be permanently expired. Also, the inbox objects accessed from the media library interface 715 may be stored in the inbox cache 104, 108.

Returning to block 640, a user may access the new object saved at block 635 by selecting an inbox interface 735 from a main interface 705. In FIG. 7c, the inbox interface 735 may display a number of inbox media objects 740. In one embodiment, the method 600 may present the inbox media objects 740 after first performing an inbox cleanup to eliminate expired or inaccessible objects 200 from the inbox as described in block 630. The inbox media object 740 may include a variety of media types including music, video, text or audio-based books, electronic games, photos, or audio and video messages. The objects 740 may each include one or more media type indicators 745 and may be sorted or prioritized in the interface 735 by a variety of object characteristics that are significant to the user. For example, objects that do not expire may be given a different priority that other objects 200. The priority of incoming objects may be assigned by the user or assigned by the device upon receipt. In a further embodiment, the inbox objects 740 may be sorted by a time until expiration 750, a title 755, a media type 745, an indication that the object 200 is new 752 since the last time the user accessed the inbox interface, a "buddy" indicator 754 that specifies that the object 200 was sent from a device 124 registered to a user that is on a "preferred source" or "buddy" list of the receiving user, or any combination of these characteristics. A user may activate the device controls 725 to select any of the inbox files 740.

The inbox interface 735 may allow the user to manage inbox objects 200 individually or the user may select multiple objects to manage. Further, the user may be presented a number of options to process inbox items. For example, a purchase 775, remove 780, or send to journal 785 option may allow a user to process inbox objects accordingly. Also, the number and type of options available to a user may change with inbox object characteristics. For example, a licensed music object may present a purchase 775, remove 780, or send to journal 785 option, however, an unlicensed object may present a "transfer to media library" or "remove" option. Upon selection of the purchase option 775, the user may be directed to a website where he may buy a license granting more rights to the media file. In another embodiment, selection of the purchase 775 option may automatically update or upgrade license information for the selected object 200. Further, the purchase option 775 may also allow the user to renew a subscription to a media object that has expired or otherwise become inaccessible. Selecting the remove option 780 may allow the user to completely remove one or all inbox objects 200 and all metadata 202 information related to the objects from the device 100. Selecting the send to journal option 785 may allow the user to delay a decision to remove or purchase the received media object 200. For example, the send to journal option may retain information related to the object in the journal file 400. From the journal file 400, the user may later choose the purchase 775, remove 780, or again select the send to journal 785 option.

Figure 7B:
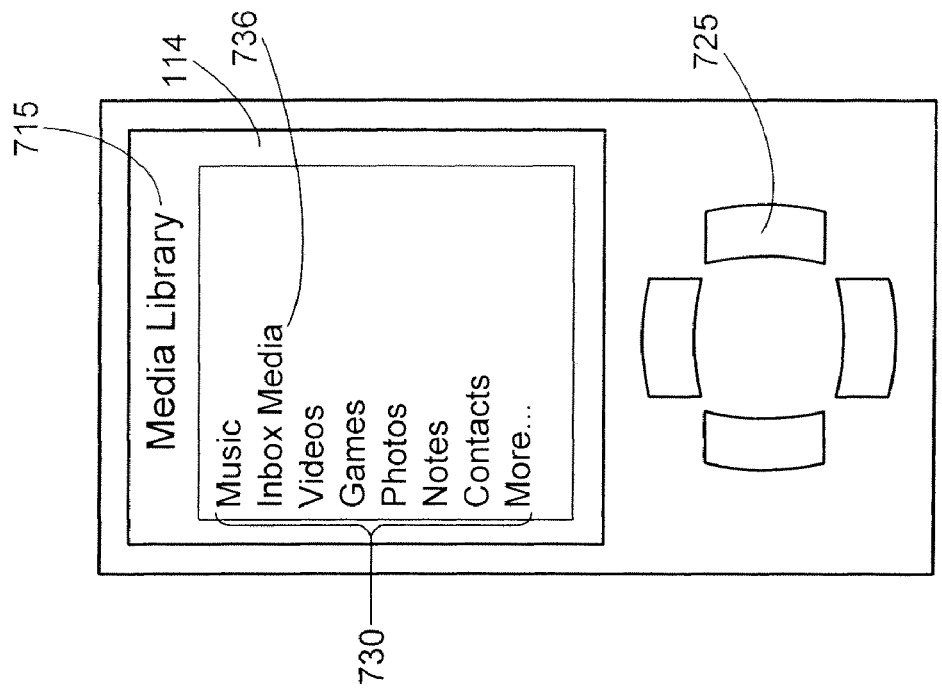
FIGS. 7*a*-*d* are illustrations of a portable media device user interface.
Figure 7A:
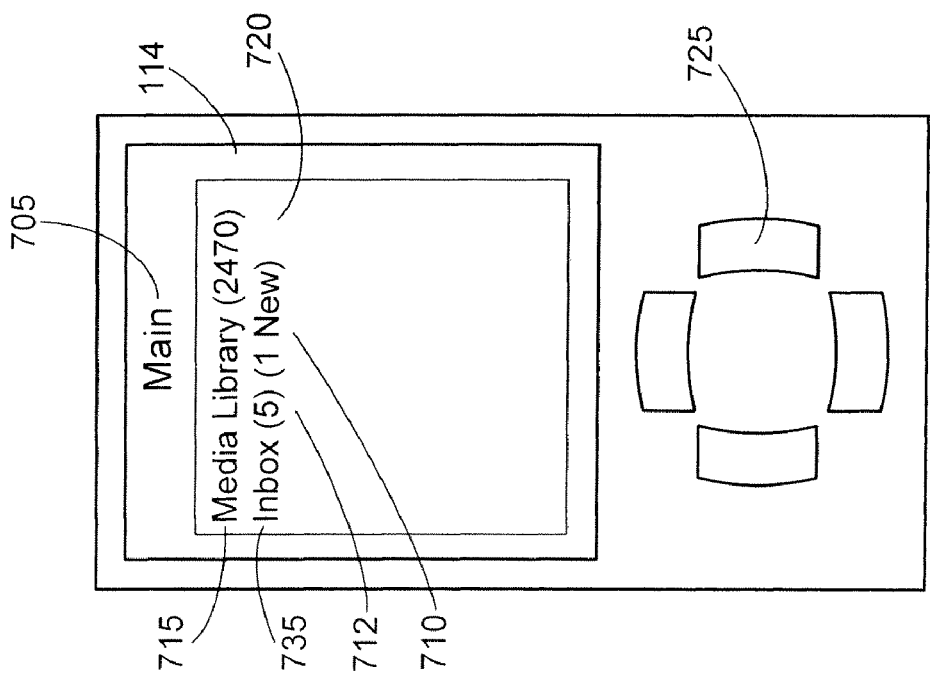
Figure 7D:
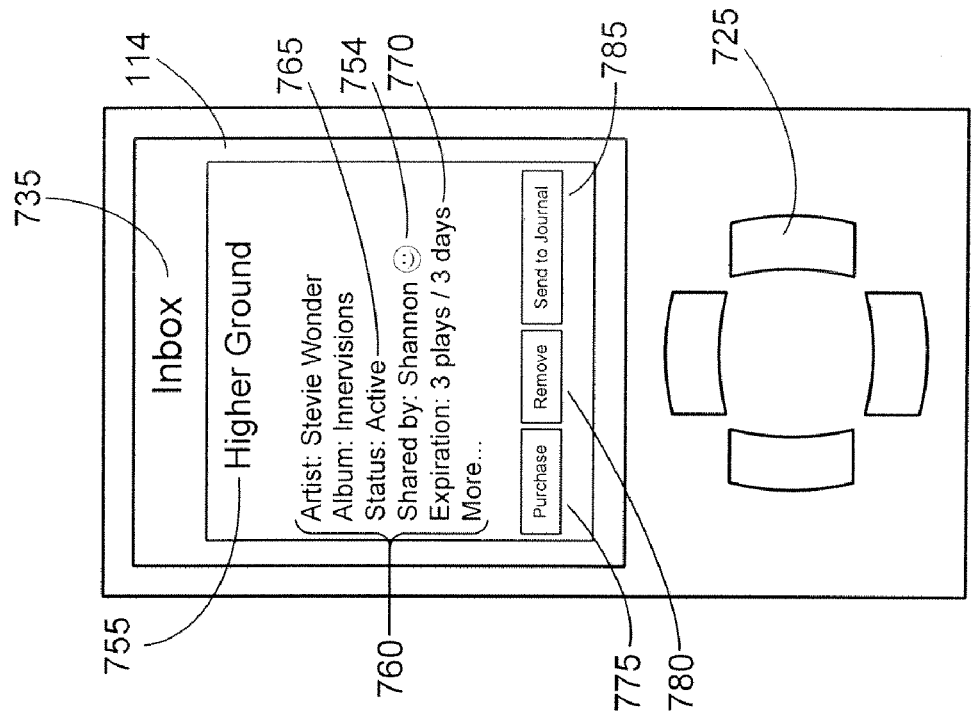
Figure 7C:
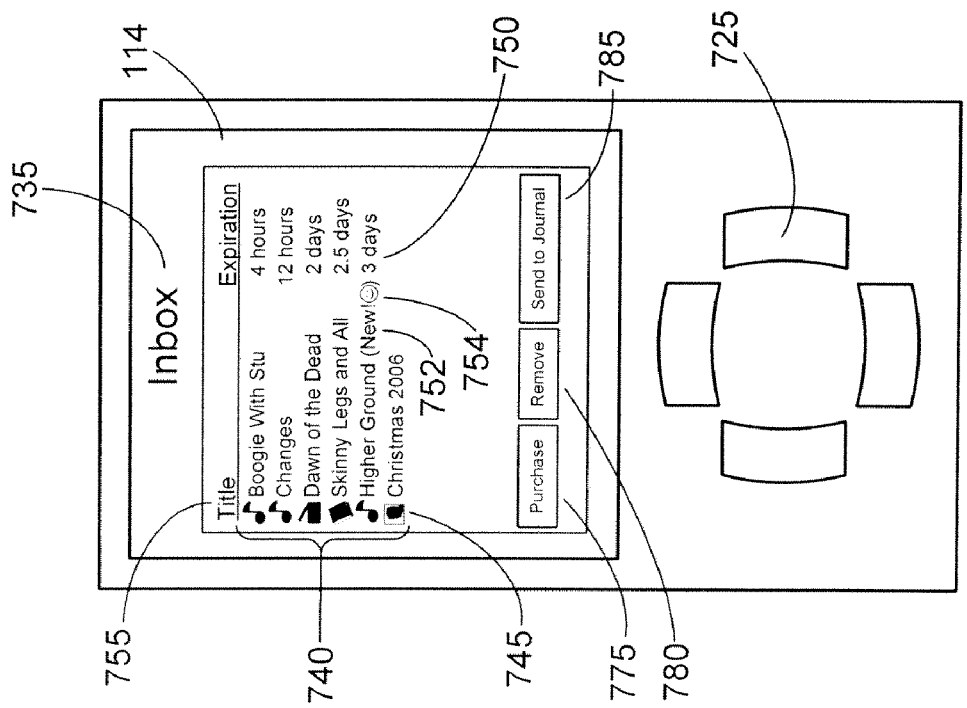

In FIG. 7d, selecting one of the files 740 may display additional information 760 about the received object. In one embodiment, selecting one of the files 740 may render the object 740 on the device 100. The information may be any of the data included in the content 201 or metadata portion 202, any of the license portions 218, 210, 212, 214, 216, or any data related to the received file that may be contained in a local or remote the journal file 400. The information 760 may also include an inbox object status 765 that may indicate, among other things, whether or not the inbox object is active or expired. For example, if the user has selected an option to manually eliminate expired or invalid inbox objects 200, or expired objects 200 are otherwise present in the inbox interface 735, the inbox interface 735 may display expired as well as active objects. Also, a journal file 400 may contain information or content related to a fully or partially expired media objects 200. Selecting an expired media object 200 from the journal file 400 or the inbox interface 735 may display information related to the expired object 200.

The inbox object status 765 may change according to the license or DRM rule associated with the object. For example, the status 765 may change between "active" and "expired" if the object 200 is associated with an active or expired subscription service, respectively. Also, a license or DRM rule associated with a once "active" object 200 may dictate that the user may no longer render the object on the device 100, and the device 100 may change the status 765 to "expired." The device 100 may assign an "active" or "expired" status 765 by accessing and comparing rules or other information from the security module 122, the object metadata 202, any of the object's licenses 210, 212, 214, 216, 218, or the journal file 400. An inbox object status 765 associated with an unlicensed object 200 may be persistently "active." In a further embodiment, if a user assigns a "license" or other license-like restrictions to a previously unlicensed object, then the resulting licensed object may expire accordingly.

Additionally, the user may sort and select any of the inbox files 740 according to any of the metadata, license, or journal elements to prioritize the inbox files in likely significance to the user. In one embodiment, the inbox items may be sorted using a variety of criteria including any of the previously described metadata categories, as well as an object type, an object origin, a time of receipt or sending, a sender name, and an expiration 770. For example, a user may sort and render those objects 200 that are about to expire first. The expiration 770 may indicate any data that relates to the accessibility period in which the user may render the inbox object. For example, the expiration 770 may indicate a number of times the user may play the inbox object or the time the user has remaining to access the inbox object. The amount of time the user has remaining to render the object 200 may be displayed in an exact, real-time count down, or as a rounded-up, approximation of the number days remaining. The expiration status 770 may be determined by accessing and comparing rules or other information from the security module 122, the object metadata 202, any of the object's licenses 210, 212, 214, 216, 218, and the journal file 400.

The expiration 770 may also apply to media library 715 objects that are subject to a subscription service. By accessing information related to the user's subscription account, object metadata 202, object license 210, 212, 214, 216, 218, or journal data 400 on the device 100, the device 100 may sort and play the media library 715 and inbox 735 objects according to an expiration time, and regardless of object origin. For example, a first user may be a member of a subscription service and may be permitted to access a large number of media objects 200 through the service. If a second user sends a media object 200 to the first user that is included in the first user's subscription, the first user may have license rights to the media object 200 under the subscription as if the first user had personally selected the media object 200 sent by the second user. The first user may view the inbox media object and, if desired, may select the item to become part of the main media library. In one embodiment, the first user may transfer an inbox media object 200 that is included in the first user's subscription from the inbox cache to the main media library. The first user's access to an inbox media object 200 that is included in the first user's subscription may be allowed under the first user's subscription terms and whether or not the second user is a member of the same subscription service.

As previously discussed, in one embodiment, inbox objects 200 may be sorted, displayed, and rendered according to a sending source. For example, a user may select a number of external media devices 124 registered to other users as "preferred sources" or "buddies." A receiving media device 100 may then assign an indicator 754 to incoming objects 200 from those "buddy" sources. In another embodiment, the indicator 754 may allow the media device 100 to optionally or automatically push all "buddy" objects to the top of a displayed inbox object 200 listing. Further, both the inbox and media library objects 200 may be organized by each sending "buddy" to create a historical listing of all objects 200 on the device 100 sent from any device 124 that is on the "preferred source" list. Using the "preferred source" indicator 754, a user may render content from any combination of "buddies" at the inbox interface 735. Still further, inbox objects 200 that become part of the main content library 715 may be rendered according any combination of "buddy" sending sources. In another embodiment, a user may select other users or a class of users to block from sending media objects. For example, if another user is blocked, that other user may receive a notification that the intended recipient blocked the message.

Selecting the media object at block 640 may also give the user access to options that may allow the user to 'upgrade' a limited license or otherwise manage individual inbox objects 760. In one embodiment, as at the previously-described inbox interface 735, the user may be presented with purchase 775, remove 780, and send to journal 785 options.

At block 650, the method may determine if the selected inbox file 740 is suitable for rendering. In one embodiment, the method may check to ensure that the limited use licenses 210, 212, 214, 216, 218 are satisfied to allow rendering the media object content as at block 620. As previously discussed, the licenses or DRM rules, may be associated with the object in a number of ways including, but not limited to, attaching the rule to the media object as it is sent from the first media device 100, or associating a license with the object once it reaches the media device 100 or is stored in the inbox cache 104, 108. If the DRM rule is satisfied to allow further access and rendering by the media device 100, then, at block 660, the user may render the object's content on the media device 100.

Figures 8A, 8B:
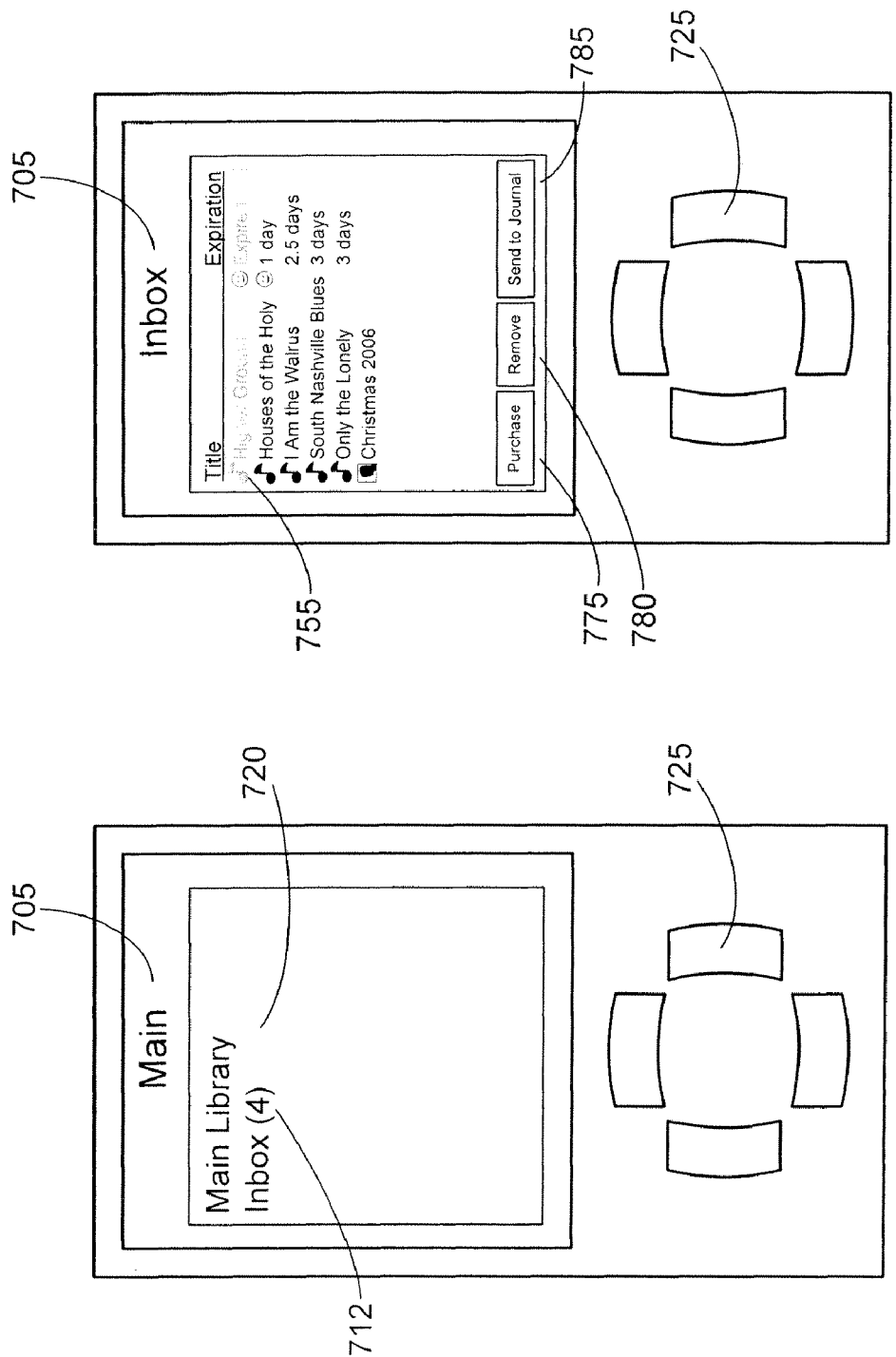
FIGS. 8*a*-*c* are other illustrations of a portable media device user interface.
Figure 8C:
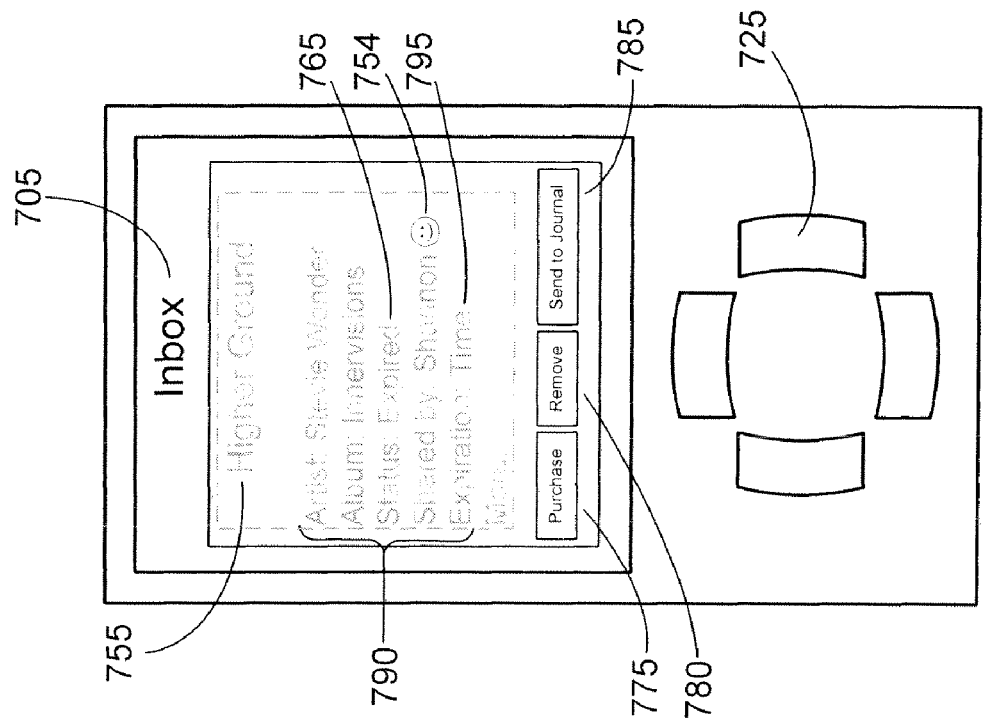

If the object 200 is not valid for rendering, at block 670, the method may identify the media object associated with the DRM rule. As illustrated in FIGS. 8*a-c*, a main menu 705 may display a menu of choices 720, as previously described. However, when the DRM rule is not satisfied, the inbox status indicator 712 may change to indicate a decrease in the number of active inbox objects. Upon selecting the inbox item from the main menu 705, a media object not satisfying a license or DRM rule to allow further access or rendering may display the object name 755 or data related to the object 790 in a manner indicating restricted access to the object. Additionally, the inbox object status 765 may further indicate that the DRM rule is not satisfied. In another embodiment, if a user attempts to render media objects from the inbox that include expired content, the user may receive a warning or other indication that the content cannot be played. For example, the user may see a self-dismissing dialog box upon attempting to render an expired object 200. The dialog may not appear on subsequent attempts to play the expired content or other expired objects. An expiration indicator 795 may show the reason for the expiration, for example, the access time was exceeded, or a number of plays was exceeded. At block 680, the method may save data related to the expired inbox media object 200 for later viewing or access. In one embodiment, the method 600 may save the metadata 202 in the journal file 400.

Whether the user is viewing active object information 760 (FIG. 7d), or expired object information 790 (FIG. 5c), the user may perform an action that may grant access to a licensed object by satisfying the DRM rule. For example, the user may select a purchase 775, remove 780, or send to journal 785 option as previously described. The method 600 may also eliminate access to the media object 200. In one embodiment, the method 600 may erase the content portion of the media object from the media device 100 to prevent any unauthorized access when the DRM rule is not satisfied. Further, upon selecting the purchase option 775, or performing any other action to allow DRM-approved access to the media object, the object may be transferred from the inbox cache to the media library. In a further embodiment, upon gaining permanent access, the inbox object may be completely or partially erased from the inbox cache and a new copy of the object may be transferred from an external entity 124.

Table 2 illustrates the media object 200 information that may be visible in the inbox interface 735 or stored in the media library or inbox cache. In one embodiment, the information may be visible after user input or after a synchronization process. In a further embodiment, the information may be visible after an inbox clean up operation 630.

TABLE 2

|  | Visible in Inbox Interface | Metadata Stored in Cache | Playable Content Stored in Library | Photo Stored |
|---|---|---|---|---|
| Input at Interface |  |  |  |  |
| Delete at Interface Level | No | No | No | No |
| Delete at Object Level | No | No | No | No |
| Synchronization |  |  |  |  |
| Expired, unset flag | Yes | Yes | No | N/A |
| Expired, set flag | No | No | No | N/A |
| Active, unset flag | Yes | Yes | Yes | Yes |
| Active, set flag | Yes | Yes | Yes | Yes |

The use of limited term licenses, including the application of a limited term license to all media objects received in an ad hoc fashion, allows users to share media with other users. This benefits the users by allowing them to share new purchases and old favorites with other users without imposing on the rights of media publishers and copyright holders. Thus, they can share a song or video without putting themselves at the risk of prosecution for copyright violation. The recipient may use the media in accordance with the limited use license to determine whether it would make a good addition to his or her collection. However, because the limited license terms are set by the publisher/copyright holder, they also are protected from rampant unlicensed copying while still allowing songs and videos to 'sell themselves' to large word-of-mouth audiences. A limited use license, such as three-days or three-plays may benefit all parties to a sharing transaction: the sender gets to share, the receiver gets to preview from a potentially large base of media, and the publisher can attract purchasers with little or no additional overhead.

Further, media devices that are capable of transferring content controlled by DRM techniques may also provide effective and accessible inbox management. By storing shared objects in an inbox cache that may be separate from the device's main content library, inbox objects subject to short expiration periods or limited accessibility may be excluded from the device's main library functions. Also, expiration and removal of inbox objects may prevent unwanted device resource and memory consumption while improving the user's experience.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

We claim:

1. A method for managing an inbox of a media device having a graphical user interface including an inbox interface and a content library interface, the media device also having a plurality of media object repositories including a content library and an inbox cache, wherein the content library and the inbox cache are independent of each other, the method comprising:

associating a limited use license with a media object, the media object including content and metadata;

communicating the media object from a computing device to the media device;

determining the limited use license to be one of satisfied or not satisfied;

in response to the limited use license being satisfied:
storing the media object in the inbox cache,
displaying the metadata in the inbox interface in order of an expiration condition of the limited use license, and
accessing the content through the inbox interface; and in response to the limited use license not being satisfied:
eliminating access to the content of the media object, and
altering a metadata appearance in the inbox interface;

wherein the expiration condition includes at least one of a period of time or a number of plays and the limited use license is not satisfied when the expiration condition is over a threshold amount.

2. The method of claim 1, further comprising storing at least a portion of the media object in the inbox cache when the limited use license is satisfied.

3. The method of claim 1, further comprising limiting access to the content when the limited use license is not satisfied.

4. The method of claim 1, wherein removing the metadata from the inbox interface when the limited use license is not satisfied comprises removing the metadata from the inbox interface when the expiration condition is satisfied.

5. The method of claim 1, wherein accessing the media object through the inbox interface when the limited use license is satisfied comprises accessing the metadata of the media object, the metadata pointing to the content of the media object.

6. The method of claim 1, further comprising accessing the media object from the inbox cache through the content library interface.

7. The method of claim 1, further comprising purchasing the media object to satisfy the limited use license.

8. The method of claim 7, further comprising transferring the media object to the content library when the media object is purchased.

9. A method for managing an inbox of a media device including a content library interface and an inbox interface, the method comprising:
   communicating a media object from a computing device to the media device, the media object including content, an expiration condition, and metadata;
   displaying the metadata in the inbox interface in order of an expiration condition;
   determining the expiration condition to be one of true or false;
   accessing the media object from the inbox interface when the expiration condition associated with the media object is false, wherein the media object may not be accessed from the content library interface; and
   in response to the expiration condition being true: eliminating access to the content of the media object and altering a metadata appearance in the inbox interface;
   wherein the expiration condition is true when at least one of a period of time since communicating the media object from a computing device to the media device has elapsed and the media object has been accessed a number of times.

10. The method of claim 9, wherein the media device comprises a content library and an inbox cache, and wherein the content library and the inbox cache are independent of each other, the method further comprising:
   storing the metadata of the media object in the inbox cache when the expiration condition is true.

11. The method of claim 9, wherein the metadata comprises audio object metadata and video object metadata, the audio object metadata comprising a song name, an artist name, an album name, a music genre, and a release date, and the video object metadata comprising a title, a television video type, a movie video type, video credits, a family rating, a release date, a duration release date, and a duration.

12. The method of claim 9, further comprising purchasing the media object; and
   transferring the media object to the content library when the media object is purchased.

13. The method of claim 1, wherein the metadata comprises audio object metadata and video object metadata, the audio object metadata comprising a song name, an artist name, an album name, a music genre, and a release date, and the video object metadata comprising a title, a television video type, a movie video type, video credits, a family rating, a release date, a duration release date, and a duration.

* * * * *